No. 644,385. Patented Feb. 27, 1900.
E. C. WASHBURN.
DRAFT RIGGING FOR ENGINES AND TENDERS.
(Application filed May 1, 1899.)

(No Model.) 3 Sheets—Sheet I.

Witnesses,
Harry Kilgour,
F. D. Merchant.

Inventor,
Edwin C. Washburn.
By his Attorney,
Jas. F. Williamson

No. 644,385. Patented Feb. 27, 1900.
E. C. WASHBURN.
DRAFT RIGGING FOR ENGINES AND TENDERS.
(Application filed May 1, 1899.)
(No Model.) 3 Sheets—Sheet 2.

Witnesses,
Harry Kilgore,
F. D. Merchant

Inventor,
Edwin C. Washburn,
By his Attorney,
Jas. F. Williamson

No. 644,385. Patented Feb. 27, 1900.
E. C. WASHBURN.
DRAFT RIGGING FOR ENGINES AND TENDERS.
(Application filed May 1, 1899.)

(No Model.) 3 Sheets—Sheet 3.

Witnesses.
Harry Kilgore
F. D. Merchant

Inventor.
Edwin C. Washburn,
By his Attorney,
Jas. F. Williamson

UNITED STATES PATENT OFFICE.

EDWIN C. WASHBURN, OF MINNEAPOLIS, MINNESOTA.

DRAFT-RIGGING FOR ENGINES AND TENDERS.

SPECIFICATION forming part of Letters Patent No. 644,385, dated February 27, 1900.

Application filed May 1, 1899. Serial No. 715,097. (No model.)

*To all whom it may concern:*

Be it known that I, EDWIN C. WASHBURN, a citizen of the United States, residing at Minneapolis, in the county of Hennepin and State of Minnesota, have invented certain new and useful Improvements in Draft-Rigging for Engines and Tenders; and I do hereby declare the following to be a full, clear, and exact description of the invention, such as will enable others skilled in the art to which it appertains to make and use the same.

My present invention has for its especial object to provide an improved draft-rigging for engine-tenders; and to this end it consists of the novel devices and combinations of devices hereinafter described, and defined in the claims.

The invention will first be specifically described and the broader features thereof considered later on.

The invention is illustrated in the accompanying drawings, wherein like characters indicate like parts throughout the several views.

Figure 1:
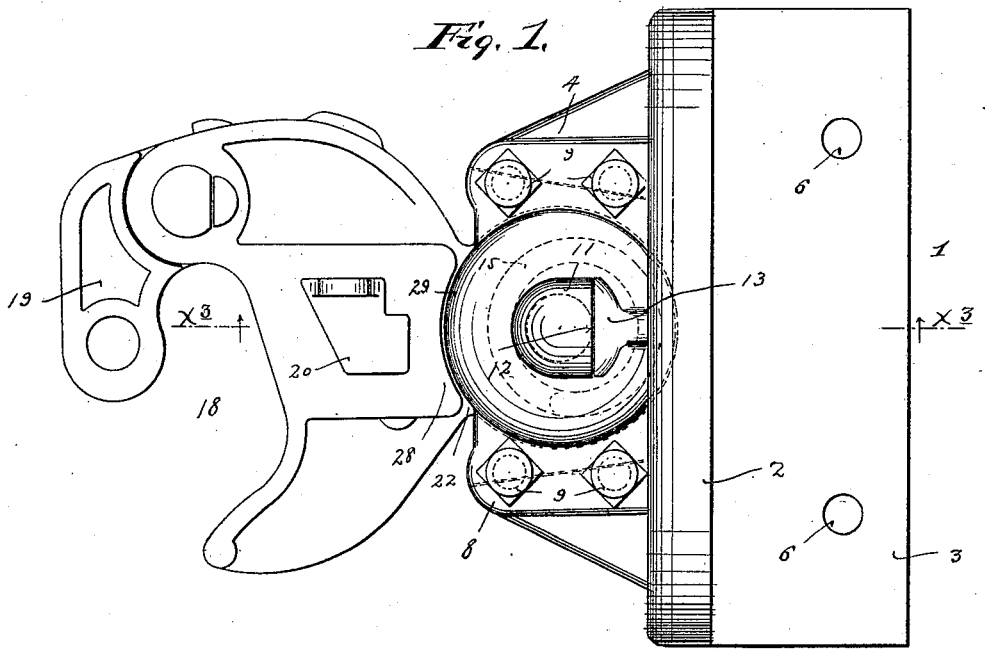
Figure 2:
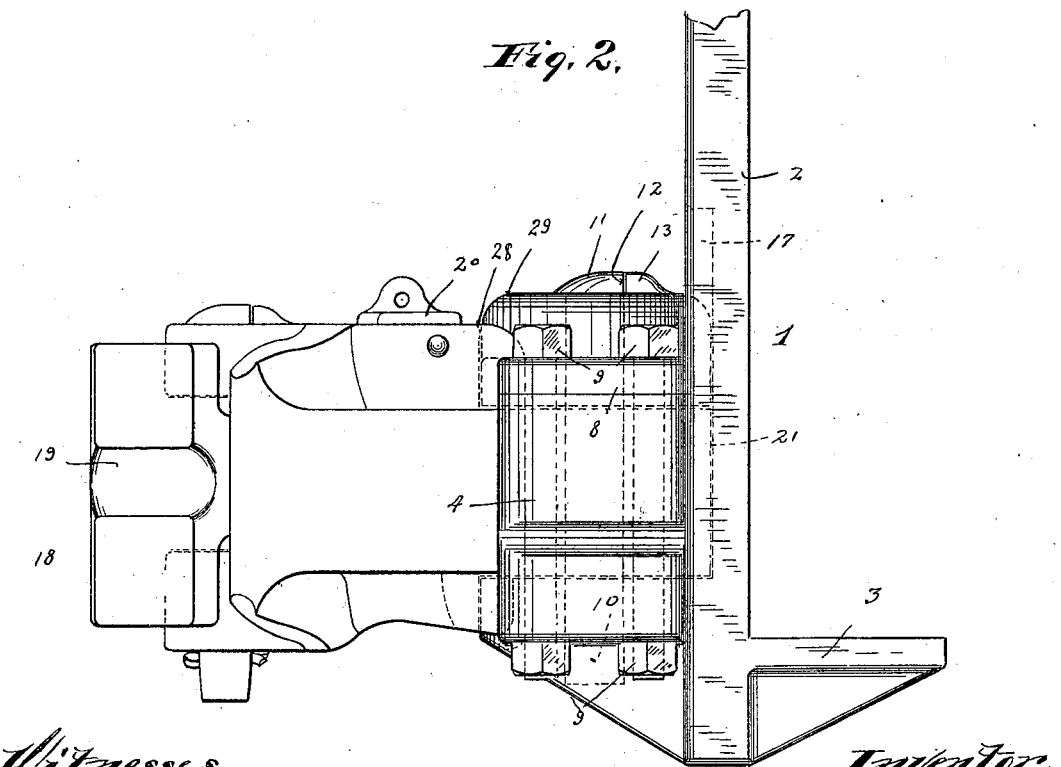
Figure 3:
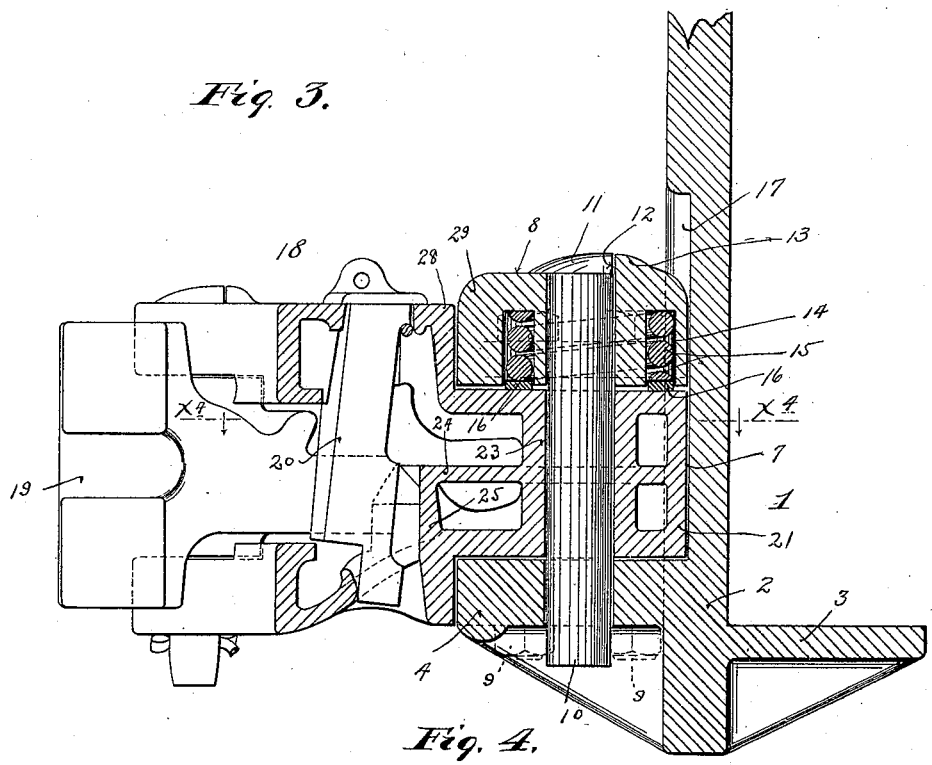
Figure 4:
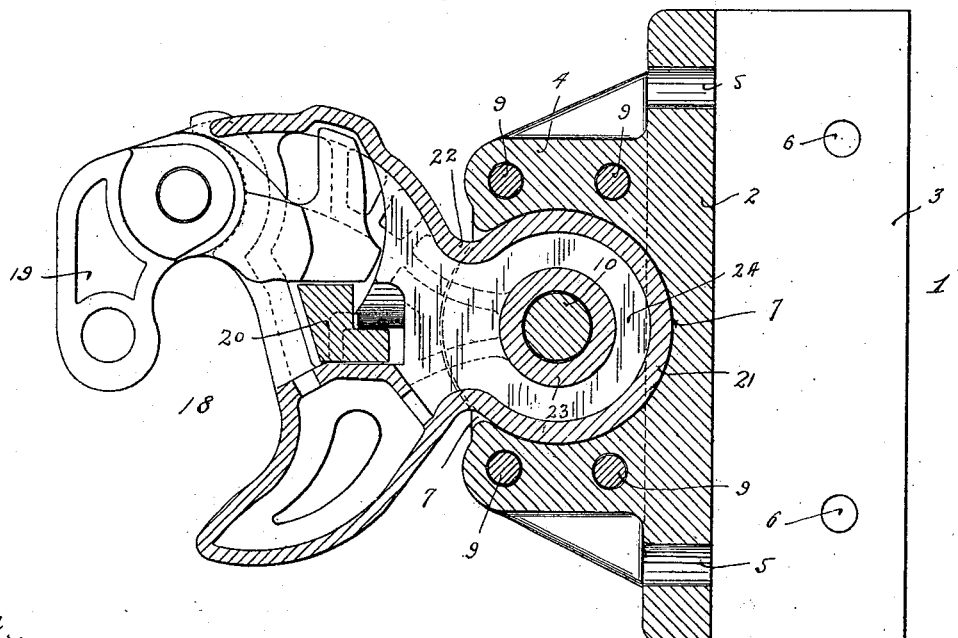
Figure 5:
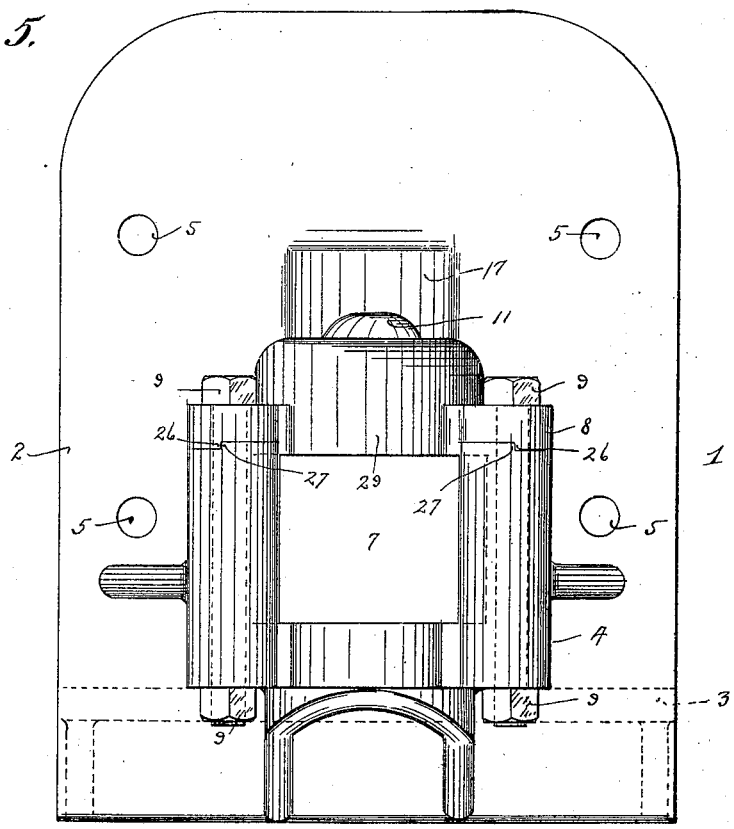
Figure 6:
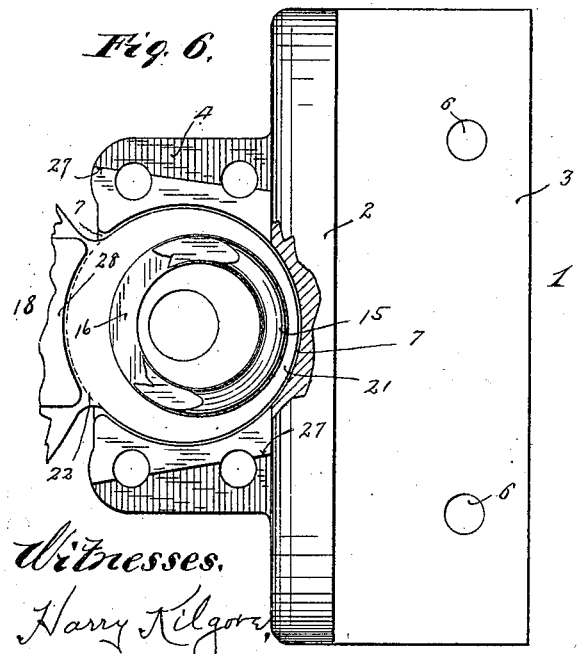
Figure 7:
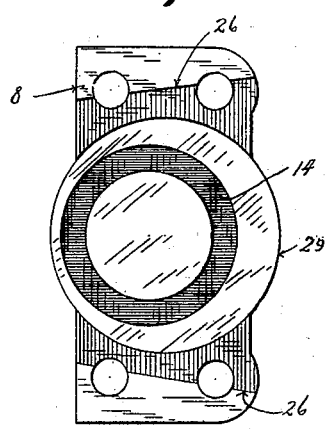

Figure 1 is a plan view of the said draft-rigging in its preferred form, involving a coupler-head and a draft-bracket, which parts are pivotally connected. Fig. 2 is a side elevation of the parts shown in Fig. 1. Fig. 3 is a vertical section taken on the line $x^3 x^3$ of Fig. 1. Fig. 4 is a horizontal section taken approximately on the line $x^4 x^4$ of Fig. 3, some parts being shown in full. Fig. 5 is a view in front elevation, showing the draft-bracket, the coupler being removed therefrom. Fig. 6 is a plan view showing the draft-bracket with the retaining-plate thereof removed and with a portion of the coupler-head connected thereto, some parts being broken away; and Fig. 7 is a bottom plan view of the so-called "retaining-plate" removed from working position.

In the preferred construction illustrated the draft-bracket (indicated as an entirety by the numeral 1) involves a heavy vertical plate or body portion 2, having an inwardly-projecting flange 3 and an outwardly-projecting block or heavy body portion 4, both of which parts 3 and 4 are preferably flanged or provided with strengthening-ribs that run into the body-plate. Bolts (not shown) which may be passed through bolt-holes 5 and 6 in the portions 2 and 3, respectively, serve to securely anchor the draft-bracket to the transverse draft beam or timber of the tender or engine.

The block portion 4 is formed with a seat or socket 7, provided with cylindrical vertical walls that are extended circumferentially in horizontal planes and form a segment of considerably more than a semicircle, or one hundred and eighty degrees, as best illustrated in Fig. 4. The seat or socket 7 thus formed is closed at its bottom and open at its top, and at its top it is provided with a retaining plate or cover 8, the ends of which project and are adapted to be rigidly secured to the sides of the block 4 by means of vertical bolts 9, passed through the said parts 8 and 4, as best indicated in Figs. 2 and 4. A heavy pin or bolt 10 is passed through suitable seats formed in the retaining-plate 8 and the bottom of the block 4 on the line of the vertical axis of the seat or socket 7. This pin 10 is provided with a head 11, which is flattened at one side of the bolt, as shown at 12. A laterally-extended lug 13, formed integrally on the upper surface of the retaining-plate 8, engages the flattened portion 12 of the said bolt-head and prevents the said bolt from turning.

In an annular seat 14, formed in the under side of the retaining-plate 8, are a short but strong coiled spring 15 and an annular bearing ring or washer 16, which parts operate as hereinafter described, it being only necessary to here note that the said annular seat 14 surrounds the pin 10 and extends eccentric thereto or with its axis offset from and positioned to the rear of the common axes of the said bolt 10 and bearing seat or socket 7. It may be here further noted that the bearing seat or socket 7 cuts into the outer face of the vertical plate portion 2 of the draft-bracket 1 and that the said plate 2 is provided with a channel 17, which extends upward a considerable distance above the said incut portion of the said socket 7.

The coupler-head, which, as illustrated, is of the general character disclosed in my several patents and, generally speaking, is of the Master Car-Builders' type, is indicated as an entirety by the numeral 18 and is provided with the pivoted knuckle 19 and locking-dog 20. The coupler-head 18 is formed at its stem or inner end with a head 21, which snugly fits the bearing seat or socket 7 of the draft-bracket, being provided with cylindrical vertical walls that extend through a segment of a circle exceeding somewhat in extent the segment of the vertical cylindrical walls of the seat or socket 7, so that a pivotal movement of the coupler-head is permitted. The upper and lower faces of the head 21 are flat, and the said head is connected to the coupler-head 18 by a strong neck portion 22. Preferably the bearing-head and neck portions 21 and 22 are cored out or formed hollow, a sleeve portion 23 being left surrounding the pin 10.

When the retaining-plate 8 of the draft-bracket is removed, the bearing-head portion 21 of the coupler may be readily inserted into its coöperating seat or socket 7 simply by dropping the same or moving it vertically downward in line with the said seat. Inasmuch as the said bearing-head 21 fits quite closely within the seat or socket 7 and inasmuch as the said seat or socket extends throughout a segment of considerably more than one hundred and eighty degrees it is evident that the said bearing-head cannot be drawn or removed from its seat by the draft or longitudinal strains thereon. Hence when the retaining-plate is applied and secured in working position, as indicated in Figs. 1, 2, and 3, the coupler is secured to the draft-bracket with freedom for a slight pivotal or oscillatory movement transversely of the car. Preferably considerable play is left between the pin 10 and the bearing-head 21 of the coupler, so that the draft and bumping strains on the coupler will be taken between said bearing-head 21 and its coöperating seat or socket 7.

The spring 15 bears tightly upon the central and rear portions of the bearing-head 21 and presses the same downward with a leverage action over the outer edge of the outwardly-projecting bracket or flange 4 as a fulcrum, and thus prevents sagging of the outer end of the coupler-head. The eccentric arrangement of the spring 15 with respect to the axis of the bearing-head 21 and bolt 10 permits the use of a large spring, which is desirable, and at the same time causes the force of the same to be applied in the vicinity of the inner end of the said bearing-head, where its strain will be transmitted to the coupler-head with as long a leverage action as is available. The annular bearing ring or washer 16 has direct contact with the upper face of the bearing-head 21.

By reference to Figs. 3 and 4 it will be seen that a horizontally-extended web 24 connects the sleeve portion 23 with the cylindrical walls of the bearing-head 21 about half-way between its upper and lower faces. This web 24 is further connected at its forward edge with the lower face of the head 21 by a vertical flange 25. (Best shown in Fig. 3.) These flanges 24 and 25, and particularly the former, serve to greatly strengthen the head 21 and the neck portion 22 without adding much weight thereto.

As best shown in Figs. 5, 6, and 7, the so-called "retaining-plate" 8 is provided with depending side ledges or shoulders 26, which flare outward or toward the coupler-head, as best shown by the bottom plan view, Fig. 7, and the upper face of the block-section 4 is formed with correspondingly-flaring depressed ledges or shoulders 27, (see Fig. 6,) with which the said ledges 26 engage. In virtue of this construction and arrangement of the ledges or shoulders 26 and 27 any slight outward movement of the retaining plate or cover 8, such as would tend to shear the bolts 9, will, in virtue of the flaring arrangement of the said ledges, tend to draw together or toward each other the sides of the block 4, thus resisting the tendency of the said sides of the block to spring apart under such strains thereon from the bearing-head 21.

The coupler-head is formed with a raised segmental shoulder 28, which under bumping strains engages the segmental intermediate portion 29 of the retaining plate or bar 8.

It will of course be understood that my invention above specifically described is capable of many modifications as to its details of construction.

What I claim, and desire to secure by Letters Patent of the United States, is as follows:

1. The combination with a coupler, of a support to which it is attached, one of which parts has a bearing-head with flat upper and lower surfaces and contracted neck portion, and the other of which has a segmental bearing seat or socket extended and engaging said bearing-head throughout more than one hundred and eighty degrees, said seat or socket having a flat lower surface against which the said head portion is pressed to hold the coupler upward, substantially as described.

2. The combination with a coupler and a support to which it is attached, said coupler having a bearing-head connected thereto by a contracted neck portion and formed with flat upper and lower surfaces, and said support having a correspondingly-formed seat or socket engaging said bearing-head throughout more than one hundred and eighty degrees, of a spring device applied to the upper surface of said bearing-head for holding the flat under surface of said bearing-head against the flat bottom of said seat or socket, whereby the coupler-head is held upward, substantially as described.

3. The combination with a coupler-head provided with a projecting bearing-head, of a bearing-bracket or support provided with a seat or socket receiving the said bearing-head and supporting the same, and a spring applied to force the said bearing-head downward into engagement with the bottom of said seat or socket and thereby to hold the coupler-head upward, substantially as described.

4. The combination with a coupler-head provided with a projecting bearing-head connected therewith by a contracted neck portion, of a bearing-bracket or support provided with a seat or socket fitting the said bearing-head and extending throughout more than one hundred and eighty degrees, and a spring applied between the said bearing-head and said bracket or support, tending to hold the forward end of the coupler upward, substantially as described.

5. The combination with the coupler 18 formed with the bearing-head 21 connected therewith by the neck 22, of the bearing-bracket having the block 4 with segmental bearing-seats 7 fitting the said bearing-head 21, the removable retaining-plate 8 formed with the spring-seat 14, and the spring 15 in the said seat 14 engaging the said bearing-head 21, for holding said coupler-head upward, substantially as described.

6. The combination with a coupler, of a support to which it is attached, one of said parts having a bearing-head connected thereto and provided with flat under and upper surfaces, and the other of said parts having a flat supporting-surface upon which said bearing-head is mounted, a removable top plate or bar securable over the upper surface of said bearing-head by means of draw-bolts, and a spring seated against said top plate or bar and engageable with the upper surface of said bearing-head, substantially as described.

7. The combination with a coupler provided with a projecting bearing-head connected thereto by a contracted neck portion, of a bearing-bracket or support provided with a seat or socket engaging the said bearing-head through more than one hundred and eighty degrees, a pivot-bolt passed axially through said socket and bearing-head, and a coiled spring surrounding said bolt with its axis eccentric to the axis thereof, said spring acting to hold upward the outward end of the coupler, substantially as described.

8. A coupler-head formed with the bearing-head 21 connected to the body thereof by the neck 22, said neck and head being formed hollow and provided with the vertical thimble 23 connecting the upper and lower walls thereof, and the horizontally-extended web 24 connecting the intermediate portion of the said thimble 23 with the side walls of said head and neck portions, substantially as described.

9. The combination with the coupler-head provided with the bearing head or projection, and a draft-bracket or support having a seat or socket in which said bearing-head is mounted, of a retaining plate or bar engaging the walls of the said seat or socket and arranged to strain the same together when drawn outward, and a bolt passed through said retaining-plate and said bearing-head for pivotally connecting them, substantially as described.

10. The combination with the coupler-head formed with the bearing-head 21 and neck 22, of the draft-bracket having the block portion 4 formed with the seat or socket 7 and with the flaring ledges or shoulders 27, the retaining-plate 8 formed with the flaring ledges or shoulders 26 coöperating with said shoulders 27, bolts connecting the said plate to said block, and a pivot-bolt passed through the said plate 8 and the said head 21, the said parts operating substantially as described.

11. The combination with a coupler provided with a projecting bearing-head connected thereto by a contracted neck portion, of a bearing-bracket or support provided with a seat or socket engaging the said bearing-head through more than one hundred and eighty degrees, a pivot-bolt passed axially through said socket and bearing-head, and a coiled spring surrounding the said bolt and acting upon the said bearing-head to hold the outer end of the coupler upward, substantially as described.

In testimony whereof I affix my signature in presence of two witnesses.

EDWIN C. WASHBURN.

Witnesses:
F. D. MERCHANT,
MABEL M. McGRORY.